June 13, 1961 E. E. RAINES ET AL 2,987,971
CUTTING APPARATUS
Filed Sept. 12, 1957 2 Sheets-Sheet 1
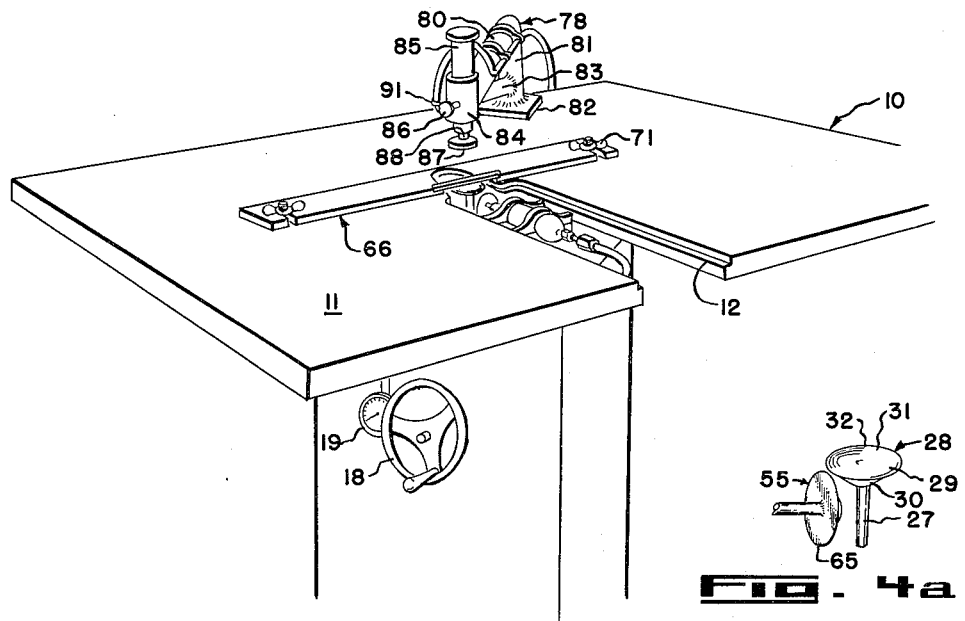
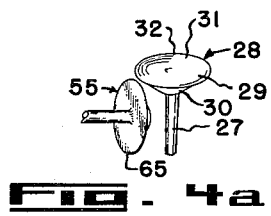
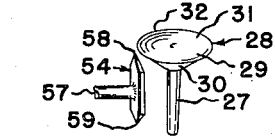
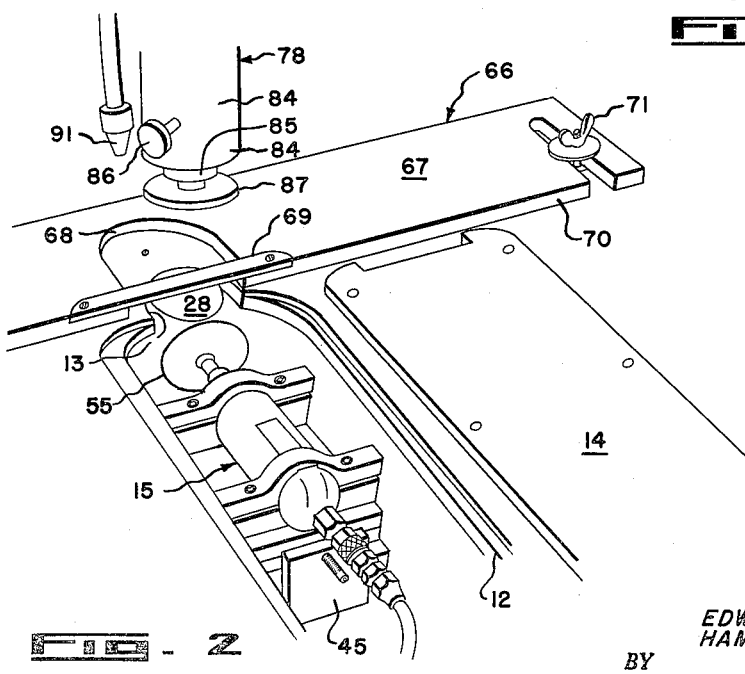
INVENTORS
EDWARD E. RAINES &
HAMPTON R. COOK
BY
ATTORNEY June 13, 1961 E. E. RAINES ET AL 2,987,971
CUTTING APPARATUS
Filed Sept. 12, 1957 2 Sheets-Sheet 2
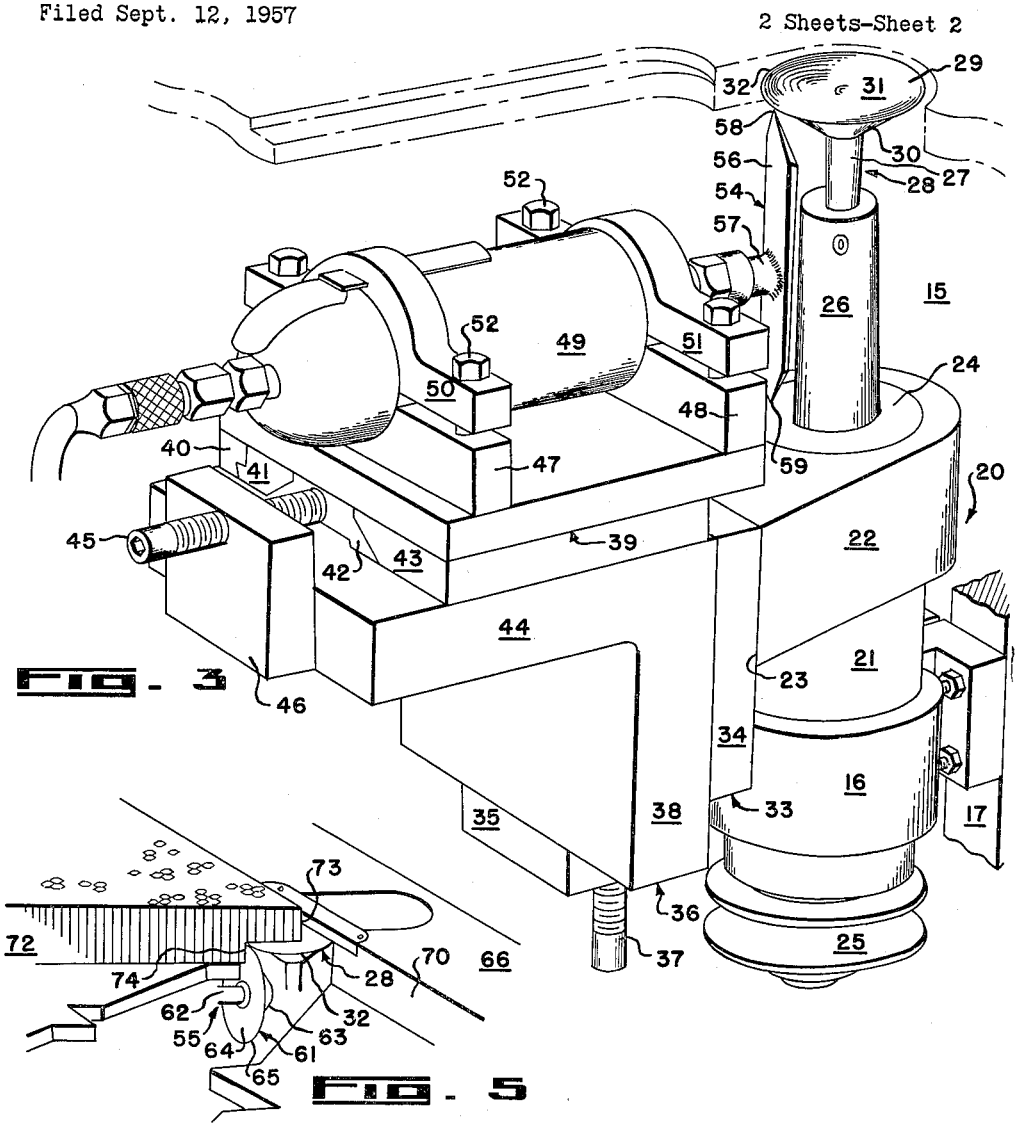
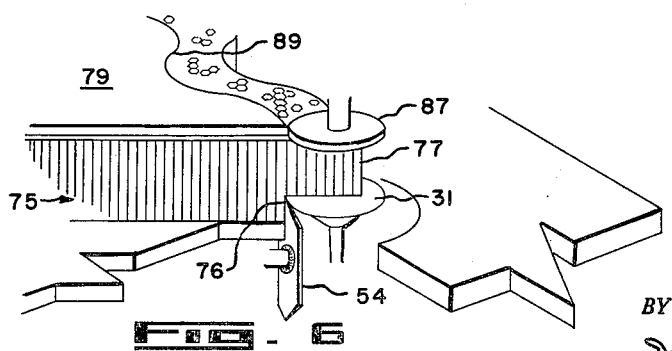
INVENTORS
EDWARD E. RAINES &
HAMPTON R. COOK
BY
*Walter T. Jaron*
ATTORNEY United States Patent Office 2,987,971
Patented June 13, 1961

2,987,971
CUTTING APPARATUS
Edward E. Raines and Hampton R. Cook, Fort Worth, Tex., assignors to General Dynamics Corporation, San Diego, Calif., a corporation of Delaware
Filed Sept. 12, 1957, Ser. No. 683,497
2 Claims. (Cl. 90—13.2)

This invention relates generally to machining devices and more particularly to an improved form of milling device adapted for the milling of step-cuts in a workpiece.

The advantages of the milling step-cutter of the present invention may be conveniently described in connection with the machining of cellular core material workpiece of the type usually employed in sandwich panel constructions. As is generally known, the use of sandwich panel type constructions is popular in the manufacture of present day aircraft and missiles, though not limited to such usage. Sandwich panel constructions typically comprise a low density material, such as a lattice-like or cellular core construction made of a suitable material, faced with sheets or panels and peripherally encompassed by suitable edge members to effect a structure which is characterized by its high strength/weight ratio. Where a multiplicity of panels of this type are employed, for example, in the construction of the outer surface of a supersonic aircraft, the facing of each panel must span smoothly from its cellular core across the edge members thence to the adjacent cellular core construction in order to present a uniform surface, contiguous with the plane of the design configuration. For this reason and for reasons relating to good bonding conditions and the like, it is necessary that a groove, or "step," be cut in the core that fits the lip of the edge member with substantially no undulation in the outer surface of the panel.

Conventional practice is to form a step at the core's edge by manual abrading with sandpaper or by employing milling equipment requiring time consuming chucking procedures. Rotary disc shapers are also presently in use, but they cut in one plane only and the other plane must be worked by another process, usually hand work. Further where rotary disc shapers are used, a rotary disc mill cutter is mounted to operate parallel with and immediately above a true plane table top. The cellular material or core is placed flat on the table and the step is made along an upper edge. Since the rotary disc cutter must perform in relation with the plane of the table top, the groove or step-cut in the upper periphery of the core will incorporate the core machining dimensional tolerances with the tolerance of the step, thus producing a very undesirable and large overall tolerance for the step. Such methods are expensive, slow, difficult to keep within low allowable dimensional tolerance, and/or unsatisfactory or very expensive in respect to cutting steps along an irregular path. A desideratum in sandwich panel production is to provide close tolerance, burr-free steps in the honeycomb-like core edge with minimum cost and as little handling as possible.

It is therefore an object of the present invention to provide an improved form of step cutter means.

Another object of the invention is to provide an improved form of rotary disc milling cutter means which is particularly adapted for the milling or cutting of precision steps in unsupported, low density materials.

Another object is the provision of a rotary disc milling step cutter device that is adapted for effecting clean, precision steps in lattice-like cellular structures.

Yet another object resides in the provision of a milling step cutter device of the above class and character that is economically adaptable to the cutting of a marginal step along an uneven border.

A still further object is to provide a simple and efficient step cutter device that is easy to use, economical to manufacture, particularly adapted for dimensionally close tolerance work, and which effectively and efficiently serves its intended purpose.

Other objects and advantages of the present invention will be readily apparent to those skilled in the art from the following description and appended drawings wherein is illustrated a preferred form of the invention, and in which:

FIGURE 1 is a perspective view of an improved rotary shaper embodying the invention.

FIGURE 2 is a perspective detail view showing the vertical rotary disc milling cutter and its drive and mounting and showing a cover plate normally carried by the shaper table.

FIGURE 3 is another perspective cut-away view showing the milling cutters and the drive and mounting therefor.

FIGURE 4a shows the preferred combination and arrangements of rotary milling cutter edge tools as employed for making a marginal step.

FIGURE 4b shows a second embodiment of the invention as illustrated by an alternate combination of milling cutter edge tools.

FIGURE 5 is a detailed view, illustrating the mill step cutter device of FIGURE 1 as adapted to mill a straight line marginal step in an unsupported low density cellular core material.

FIGURE 6 is a detailed view of the mill step cutter device of FIGURE 1, as employed in conjunction with a suitable template to effect a marginal step along an uneven border of unsupported low density honeycomb-like material.

The present invention is exemplified in a device which automatically and economically effects precision steps in low density, cellular core material such as is embodied in a high strength/weight ratio sandwich panel, so that the edge members of the panel will fit flush with the other surface of the core, thus enabling the skin to be smoothly bridged thereacross.

The present rotary shaper is indicated generally in its entirety by the numeral 10 and comprises a usual base upon which is mounted a smooth-faced rectangular work table or platform 11 having a generally rectangularly shaped cut-out portion 12 extending transversely to a generally semi-circular cut-out 13. Cut-out portion 12 is adapted to be closed by a cover plate 14 when the shaper is in operation; cut-out 13 remains open, however, to permit the operation of the cutters therethrough. In closed position, cover plate 14 rests upon suitable shoulders or ledges provided at opposite sides of cut-out 12 and its upper face lies in the plane of the upper face of table 11 whereby a smooth continuous surface is presented.

Disposed beneath table 11 is the drive and cutter mounting assembly of the present rotary shaper, which assembly is indicated generally by the numeral 15. Assembly 15, as shown in FIGURE 3, is supported by a usual clamping bracket 16 which is suitably affixed to a vertically adjustable member 17. Conventional rotary shaper screw gear means (not shown) are associated with vertical member 17 to effect vertical, rectilinear adjustment of assembly 15 by vertical movement of bracket 16. Actuation of such screw gear means is effected by a conventional hand-wheel 18, the amount of movement being indicated by a usual gauge 19. It is understood that the particular manner of supporting assembly 15 and the particular means for effecting rectilinear, vertical movements thereof form no part of the present invention. Any suitable means for properly holding assembly 15 relative to table 11 and for moving it relative to the table to bring the cutters (to be described) supported by the assembly into proper cutting position may be employed.

Bracket 16 fixedly supports a spindle housing 20 comprising a lower cylindrical portion 21 and an upper portion 22 having a flat lateral face 23. Within the bore of spindle housing 20 is suitably rotatively mounted a suitable spindle 24 to the lower end of which is affixed a usual sheave 25 adapted to be driven by a conventional motor and belt arrangement which is included in the present rotary shaper but not shown.

Carried at the upper end of spindle 24 is a collet 26 adapted to receive and hold the shank 27 of a mill cutter 28. Mill cutter 28, as shown in FIGURE 3, comprises, in addition to its shank 27, a blade portion 29. Blade portion 29 comprises a disk-like body having a beveled lower face 30 which merges into an upper face 31 to provide a cutting or knife edge 32.

Suitably rigidly affixed to flat face 23 of spindle housing portion 22 is a support element 33 comprising a downwardly extending plate 34 to the lower face of which is affixed, as by welding, a second plate 35 which extends normal to plate 34. Carried by support element 33 is a generally L-shaped support member 36 which has a conventional dove-tail connection (not shown) with plate 34 whereby support member 36 may be vertically moved relative to horizontal plate 35. A screw element 37 supported by plate 35 and having an attachment at its inner end to vertical leg 38 of L-shaped support member 36 is adapted to be actuated to effect vertical movement of such support member 36. Screw element 37 may be provided with a conventional flat-sided recess in its end to accept a conventional flat-sided wrench for effecting turning movement of the screw 37.

A cradle or support member 39 is adjustably, slidably connected, by usual ways 40, 41, 42 and 43 of a dove-tail arrangement, to the upper face of horizontal leg 44 of L-shaped support member 36. Way 42 is suitably affixed to the undersurface of cradle 39 while the other ways are suitably affixed to horizontal leg 44 with ways 41 and 43 effecting a guide or track for way 42. A screw element 45, supported by an upwardly projecting piece 46 carried at the forward end of horizontal leg 44 is attached at its inner end to way 42 which is secured to cradle 39. It is apparent that actuation of screw element 45 by an appropriate tool will effect horizontal rectilinear movement of cradle 39.

Cradle 39 includes a pair of spaced, fixed, cross-pieces 47 and 48 having curved recesses for the support of a conventional motor 49 which may be of the air-driven type. Clamping cross-pieces 50 and 51 with their associated bolts 52 cooperate with lower cross-pieces 47 and 48 to hold motor 49 in place.

Motor 49 embodies a usual, axially extending, rotating shaft to the end of which is adapted to be suitably secured the shank of a milling cutter. The cutter carried by motor 49 may be of the form shown in FIGURES 3 and 4b and indicated therein by the numeral 54 or may be of the form shown in FIGURES 2, 4a, 5 and 6 and indicated by the number 55. Cutters 54 and 55 cooperate with cutter 28, above described, and perform their cutting actions in planes angularly (preferably normal) disposed to the plane in which a cut is effected by cutter 28.

Cutter 54 of FIGURES 3 and 4b comprises a blade portion 56 and a shank 57 with the blade portion 56 comprising an elongated body so constructed that the forward and rear faces and opposite edges at both ends thereof merge to form pointed blade ends as shown at 58 and 59.

The other cutter embodiment 55 comprises a blade portion 61 and a shank 62. Blade portion 61, as shown, comprises a body of circular form with the outer or beveled face 63 thereof merging into the inner face 64 to form a cutting or knife edge 65. Shank 62 is suitably affixed to inner face 64 as by welding.

Cutter 54, having the pointed ends, is used with cutter 28 when a step is to be cut in a cellular core having an uneven peripheral border and cutter 55 is adapted for use with cutter 28 when a cut is made along a straight line, as will be more fully described hereinafter.

Guides are provided for controlling the width of a step to be cut into the edge of a cellular core workpiece. Where the peripheral edge of a workpiece is a straight-line, a guide or fence 66 as shown in FIGURES 1, 2 and 5 is employed. Guide 66 comprises a flat, rectangular plate 67 having a central cut-out as at 68 to permit vertical adjustment of cutter relative to the top of table 11. A straight-edge member 69 is fitted and suitably secured into appropriate recesses in the face of plate 67 to span cut-out 68, overlie cutter 28, and form a continuation of the straight lateral edge 70 of plate 67. Guide 66 is slidably adjustable upon table 11 and when in desired position is adapted to be secured by conventional means such as wing screws 71 which fit into suitable threaded openings provided in table 11. FIGURE 5 illustrates guide 66 in use with a slab-like cellular-core workpiece, indicated by the numeral 72, having a straight peripheral edge 73 into which a step 74 is to be cut.

Where the peripheral edge is other than straight, as is the case with the cellular-core workpiece 75 of FIGURE 6, the preferred means for guiding the formation of a step 76 in the undulating peripheral edge 77 thereof embodies a guide assembly 78 shown in FIGURES 1 and 2 and a template 79 shown in FIGURE 6. Guide assembly 78 comprises an elongated, tubular, over-arm support 80 affixed at one end, as by welding, to a short tubular member 81 which is fixed to and extends upright from a base plate 82. A tubular brace 83 interconnects over-arm support 80 and upright member 81 for added strength. Base plate 82 is adapted to rest on the top of table 11 and may be held to the table by suitable clamps or other conventional holding means to maintain guide assembly 78 in required position.

Over-arm support 80 at its free end fixedly carries a sleeve 84 whose longitudinal axis is normal to the face of table 11. Sleeve 84 receives a shaft 85 which is verticaly adjustable therewithin, being held in desired adjusted position by a thumb screw 86. A stylus 87 is carried at the lower end of shaft 85. Stylus 87 is suitably rotatably affixed to a stem 88 which is threaded to be received within an internally threaded hole in the bottom of shaft 85.

Stylus 87, as shown, is of disk form and will have a diameter equal to the diameter of mill cutter 28 carried by spindle 24. Should the size of cutter 28 be changed then a new stylus 87 conforming in size to the changed cutter is attached to shaft 85. In operating position stylus 87 is so located, by appropriate location of assembly 78 on table 11, as to be positioned over cutter 28 and in co-axial relationship therewith and its planar peripheral edge will ride along the lateral edge 89 of template 79 during a cutting operation. Template 79, as shown, has its lateral edge 89 formed to the same undulating contour as the edge contour of workpiece 75 in which the step is to be cut.

Assembly 78 may serve as a convenient support for an air nozzle 91 which will direct air to keep chips clear of the guiding surfaces while work is in progress.

The particular combination of cutters and the particular guide means employed to effect a step in a cellular core workpiece is determined, as stated above, by the form of the lateral edge of the particular workpiece.

Assuming that the workpiece has a straight, flat face such as face 73 of workpiece 72 shown in FIGURE 5 then cutter 28 is used in combination with circular cutter 55 and straight-edge guide 66 is employed with this combination of cutters.

Knowing the height and width of the step which is to be cut in workpiece 72, cutters 28 and 55 of appropriate size will be selected, with cutter 28 being mounted on spindle 26 and adapted to make a horizontal cut and cutter 55 being carried by the shaft of motor 49 and adapted to make a vertical cut. By appropriate adjustment of screw elements 37 and 45 cradle 39 will be moved the necessary vertical and horizontal distances to position cutter 55 in desired position relative to cutter 28 wherein the cutting edge 65 of cutter 55 will be in contact with cutting edge 32 of cutter 28. Assembly 15 which carries both cutters 28 and 55 will be moved vertically by manipulation of handwheel 18 to raise the cutters to the appropriate height relative to the top of table 11 so that a step having the desired vertical height can be cut in workpiece 72 which will be supported on table 11. Straight-edge guide 66 is located on table 11 with its straight lateral face 70 positioned above the face of cutter 28 and disposed horizontally rearwardly from the point of contact of cutters 28 and 55 a distance equal to the dimension of the horizontal cut to be made in workpiece 72. After guide 66 has been properly located wing screws 71 are tightened to hold it in such location. Cover plate 14 is also inserted in place over cut-out 13 to complete the upper surface of the table 11.

With the cutters 28 and 55 and with straight-edge guide 66 in position workpiece 72 is placed on flat on table 11 with its straight lateral face 73 against the straight lateral face 70 of guide 66 and rotation of cutters 28 and 55 effected through actuation of their associated motors. It is understood that cutters 28 and 55 rotate in the proper direction to cut into workpiece 72. With cutters 28 and 55 rotating, workpiece 72 is pushed along the table 11 and guide 66, as by hand, and into and past cutters 28 and 55 whereby such cutters simultaneously effect a horizontal cut and a vertical cut in workpiece 72 to form the desired step 74 therein.

If the workpiece has an edge of undulating contour such as edge 77 of workpiece 75 shown in FIGURE 6 then a template 79 is prepared having a lateral edge 89 conforming in contour to edge 77. Template 79 is suitably held to the flat upper face of workpiece 75 with its lateral edge 89 spaced from lateral edge 77 of the workpiece a distance equal to the horizontal cut to be made in the workpiece. It is understood, of course, that when template 79 is positioned on the workpiece 75 the undulations of its lateral edge 89 are located so that they conform to the undulations of the lateral edge 77 of the workpiece.

Cutter 54 having the pointed ends is substituted for cutter 55 and cradle 39 is adjusted to bring cutter 54 into proper relationship with cutter 28 wherein the pointed ends will touch the knife edge of cutter 28. Cutters 28 and 54 are of course of proper size to perform the desired task. The combination of the two cutters are raised by handwheel 18 to the proper height relative to the table 11 so that a step having the desired vertical height will be effected.

Assembly 78 is properly positioned upon table 11 to locate circular stylus 87 directly over and in co-axial relationship with blade portion 31 of cutter 28. The distance of stylus 87 above blade 31 of cutter 28 conforms to the height of the workpiece 75 in which the step is to be cut. As stated hereinbefore, stylus 87 has the same diametric dimension as blade portion 31.

Now with the cutters 28 and 54 at the proper height and the stylus 87 properly located relative to the blade portion of cutter 28 the workpiece 75 is ready to be machined. Workpiece 75 with its template 79 in place is pushed along on the underface, as by hand, toward the cutters 28 and 54 and the stylus 87 to bring the stylus into engagement with the undulating edge 89 of the template 79. As the workpiece 75 is pushed past the rotating cutters it is guided so that stylus 87 rides along edge 89, thus when the pass is completed a longitudinally undulating step 76 will be cut into the edge 77 of workpiece 75 conforming in shape to edge 89 of the template 79.

Thus there has been described a table type rotary milling device particularly adapted for effectively and efficiently machining cellular, low density, honeycomb core material to effect a close tolerance step of desired dimensions in the peripheral border of the core with a mimimum of handling and with economy. It is contemplated that the material of the honeycomb core may be either metallic or non-metallic, such as aluminum, stainless steel and titanium or glass fiber, phenolic or the like.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. An apparatus adapted for machining a step cut in a planar lateral edge of a workpiece formed of low density, cellular core material, said apparatus comprising a work table upon which said workpiece may be moved, a pair of simultaneously rotatable milling cutters each having a circular cutting edge, adjustable support means for positioning said cutters with their peripheral cutting edges in contact with one another and disposed for rotation in planes normal to each other, the support means for one of said cutters being adjustably positioned on the support means for the other of said cutters for adjustable positioning of its cutter relative to the other cutter, said second-mentioned support means being movable to simultaneously locate said cutters relative to said work table in position to be engaged by said workpiece, and guide means for directing the line of movement of said workpiece through the cutting planes of said cutters to effect a step cut in said planar lateral edge of said workpiece, said guide means comprising a member adapted to be affixed to said work table and having a straight edge engageable by said planar lateral edge during movement of said workpiece in the cutting operation.

2. An apparatus adapted for machining a step cut in a workpiece having a lateral edge of undulating contour, said workpiece being formed of low density, cellular core material, said apparatus comprising a work table upon which said workpiece may be moved, a pair of milling cutters operatively mounted relative to said support in position to be engaged by said workpiece, said milling cutters being arranged to contact one another at their peripheral edges for cutting movement of their cutting edges in different planes determined by the shape of the step cut to be made, adjustable support means for said cutters, the support means for one of said cutters being adjustably carried by the support means for the other of said cutters for adjustable positioning of its cutter relative to the other cutter, said second-mentioned support means being movable to locate both of said cutters simultaneously relative to said work table, and guide means for directing the line of movement of said workpiece through the cutting planes of said cutters to effect a step cut in said lateral edge, said guide means comprising a template carried by said workpiece spaced from said undulating lateral edge and having a guide edge shaped in conformity with the shape of said undulating lateral edge and a stylus cooperating with said template, said stylus comprising a rotatable member engageable by said guide edge during movement of the workpiece in the cutting operation.

References Cited in the file of this patent

UNITED STATES PATENTS

| | | |
|---|---|---|
| 186,703 | Arbey | Jan. 30, 1877 |
| 927,436 | Siscoe | July 6, 1909 |
| 1,463,791 | Brekelmans | Aug. 7, 1923 |
| 2,089,074 | Sharp | Aug. 3, 1937 |
| 2,507,982 | Krause | May 16, 1950 |
| 2,660,243 | Lomazzo | Nov. 24, 1953 |
| 2,761,357 | Steele et al. | Sept. 4, 1956 |

FOREIGN PATENTS

| | | |
|---|---|---|
| 834,448 | Germany | Mar. 20, 1952 |
| 88,108 | Sweden | Dec. 15, 1936 |